O. ABELL.

Improvement in Cream-Savers.

No. 128,090. Patented June 18, 1872.

Witnesses.

Inventor.
Otis Abell.
By Hill & Ellsworth,
His Attorney 128,090

UNITED STATES PATENT OFFICE.

OTIS ABELL, OF WITOKA, MINNESOTA, ASSIGNOR OF ONE-HALF OF HIS RIGHT TO R. D. FELLOWS, OF SAME PLACE.

IMPROVEMENT IN CREAM-SAVERS.

Specification forming part of Letters Patent No. 128,090, dated June 18, 1872.

*To all whom it may concern:*

Be it known that I, OTIS ABELL, of Witoka, in the county of Winona and State of Minnesota, have invented an Improved Cover for Churns; and I do hereby declare the following to be a full and exact description of the same, reference being had to the accompanying drawing forming part of this specification, in which—

Figure 1:
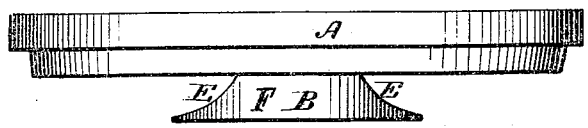
Figure 2:
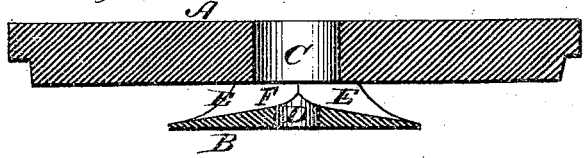
Figure 3:
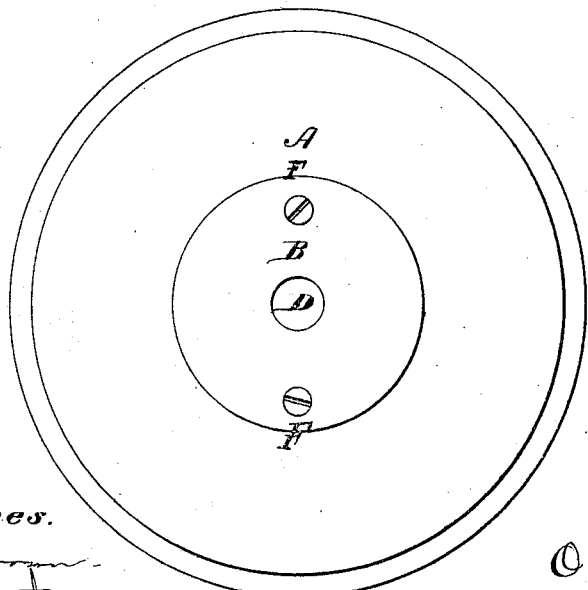

Figure 1 is a side elevation of a churn-cover constructed in accordance with my invention. Fig. 2 is a transverse section of the same; and Fig. 3 is a bottom plan view.

Similar letters of reference in the accompanying drawing denote the same parts.

My invention has for its object to improve the construction of churn-covers for the purpose of preventing the cream or milk from slopping out of the churn when the dasher is operated, and to cause such portions as are carried up by the dasher-handle to flow back into the churn without passing to the top of the cover. To the accomplishment of these results the invention consists in applying a wooden disk to the under side of an ordinary wooden churn-cover, said disk being provided with a central opening to guide the churn-dasher, and having two grooves cut in its upper surface, inclining downward and outward from the central opening in opposite directions so as to form two channels beneath the cover. The opening in the latter is somewhat enlarged to remove its edges from contact with the dasher-handle. The disk is open laterally at two points only, the remaining portion being in contact with the cover. By this construction two narrow channels are formed to conduct back into the churn such portions of cream as are carried up through the disk by the dasher-handle, while the closed sides of the disk—occupying a larger area circumferentially than the openings—prevent the cream from slopping up between the disk and cover.

In the accompanying drawing A, is the ordinary flat wooden cover of a churn, and B is the flat disk of wood secured to its under surface, covering the central opening. The disk is made flat upon its upper and lower surfaces, and provided with a central opening, D, for the passage of the dasher-handle. This opening is of sufficient diameter to permit the passage of the handle into close contact, while the opening C in the cover is of larger diameter, so as to remove its edges from contact with the handle. E are the channels formed in the disk under the cover, and inclining outward in opposite directions from the central opening. The upper surface of the disk is in contact with the cover, excepting at points immediately over the channels, and its edges between the latter are much larger in area than the mouths of the channels, so as to form guards F to prevent the cream from slopping up between the disk and cover.

The principle of construction consists in providing a closed shield or guard entirely around the opening in the cover excepting at two points, where channels or inclined passages are formed of such size as to permit only the backward flow of the cream carried by the dasher-handle above the disk. It is not enough that provision be made for carrying back the cream, but guards must also be formed to prevent the cream from slopping above the disk and flowing out upon the cover.

My invention renders the flat disk capable of being made separately and applied to an ordinary churn-cover without cutting away the under surface of the latter in the least.

I am aware that a conical block has been suspended beneath the opening in a churn-cover, the edges of the opening being cut away to admit the apex of the cone and form an inclined space completely around the latter. This, however, I do not claim as my invention.

Having thus described my invention, what I claim is—

The flat disk B, secured to the under side of the churn-cover, in contact therewith, around the enlarged opening C, and constructed with the two channels E inclined outward from the central opening D in opposite directions, and with intermediate circumferential guards F between the channels, as herein shown and described, for the purpose specified.

To the above specification of my invention I have set my had this 22d day of February, 1872.

OTIS ABELL.

Witnesses:
R. D. FELLOWS,
ALFRED E. ABELL,